United States Patent
Pino et al.

(10) Patent No.: US 9,406,016 B2
(45) Date of Patent: Aug. 2, 2016

(54) METHOD AND APPARATUS FOR MONITORING NETWORK TRAFFIC

(71) Applicant: ICF INTERNATIONAL, Baltimore, MD (US)

(72) Inventors: Robinson E. Pino, Potomac, MD (US); Michael J. Shevenell, Darlington, MD (US)

(73) Assignee: ICF INTERNATIONAL, Baltimore, MD (US)

( * ) Notice: Subject to any disclaimer, the term of this patent is extended or adjusted under 35 U.S.C. 154(b) by 171 days.

(21) Appl. No.: 13/658,513

(22) Filed: Oct. 23, 2012

(65) Prior Publication Data
US 2014/0149327 A1    May 29, 2014

(51) Int. Cl.
*G06N 3/08*    (2006.01)
*G06N 3/02*    (2006.01)

(52) U.S. Cl.
CPC .. *G06N 3/08* (2013.01); *G06N 3/02* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 7,353,473 B2 | 4/2008 | Pino et al. | |
| 7,902,857 B1 | 3/2011 | Pino | |
| 8,249,838 B2 | 8/2012 | Pino et al. | |
| 8,274,312 B2 | 9/2012 | Pino et al. | |
| 8,275,728 B2 | 9/2012 | Pino | |
| 2012/0217995 A1 | 8/2012 | Pino et al. | |
| 2013/0311413 A1 | 11/2013 | Rose et al. | |

OTHER PUBLICATIONS

White, A Neural Network Approach to Border Gateway Protocol Peer Failure Detection and Prediction, Master's Thesis, California Polytechnic State University, San Luis Obispo, Dec. 2009, pp. 1-149.*
"ASCII and binary characters (the characters)", URL: http://www.roubaixinteractive.com/PlayGround/Binary_Conversion/The_Characters.asp, Nov. 15, 2012, 4 pages.
"Backpropagation", From Wikipedia, the free encyclopedia, URL: http://en.wikipedia.org/wiki/Back_propagation, downloaded Nov. 8, 2012, 4 pages.
Paul J. Werbos, "Backpropagation Through Time: What it Does and How to Do It", Proceedings of the IEEE, 78 (1990) 1550-1560.
"tcpdump", From Wikipedia, the free encyclopedia, URL: http://en.wikipedia.org/wiki/Tcpdump, downloaded Nov. 15, 2012, 3 pages.
"Ethernet frame", From Wikipedia, the free encyclopedia, URL: http://en.wikipedia.org/wiki/Ethernet_frame, downloaded Nov. 16, 2012, 6 pages.
"Network interface controller", From Wikipedia, the free encyclopedia, URL: http://en.wikipedia.org/wiki/Network_interface_controller, downloaded Nov. 16, 2012, 3 pages.

(Continued)

*Primary Examiner* — Wilbert L Starks
(74) *Attorney, Agent, or Firm* — Squire Patton Boggs (US) LLP (57) ABSTRACT

A system that collects data from monitored network traffic. The system inputs, in parallel, the data through inputs of a neural network. The system compares an output of the neural network, generated in response to the inputted data, to at least one predetermined output. If the output of the neural network corresponds to the at least one predetermined output, the system provides a notification relating to the data.

18 Claims, 10 Drawing Sheets

(56) References Cited

OTHER PUBLICATIONS

"Wireless network interface controller", From Wikipedia, the free encyclopedia, URL: http://en.wikipedia.org/wiki/Wireless_network_interface_controller, downloaded Nov. 19, 2012, 3 pages.

"Network Packet", From Wikipedia, the free encyclopedia, URL: http://en.wikipedia.org/wiki/Data_packet, downloaded Nov. 19, 2012, 8 pages.

"Ethernet", From Wikipedia, the free encyclopedia, URL: http://en.wikipedia.org/wiki/Ethernet, downloaded Nov. 19, 2012, 11 pages.

"MAC address", From Wikipedia, the free encyclopedia, URL: http://en.wikipedia.org/wiki/MAC_address, downloaded Nov. 19, 2012, 6 pages.

"Internet Protocol", From Wikipedia, the free encyclopedia, URL: http://en.wikipedia.org/wiki/Internet_Protocol, downloaded Nov. 19, 2012, 5 pages.

TcpDump/WinDump—The Wireshark Wiki, URL: http://wiki.wireshark.org/TcpDump/WinDump, downloaded Feb. 26, 2013, 1 page.

TcpDump—The Wireshark Wiki, URL: http://wiki.wireshark.org/TcpDump, downloaded Feb. 26, 2013, 1 page.

WinDump—The Wireshark Wiki, URL: http://wiki.wireshark.org/WinDump, downloaded Feb. 26, 2013, 1 page.

\* cited by examiner

| Input vector in ASCII | Input vector converted to binary |
|---|---|
| Test | 01010100011001010111001101110100 |
| @mail.com | 01000000011011010110000101101001011011000010111001100011011011110110110101 |
| 723! | 00110111001100100011001100100001 |
| & | 00100110 |

METHOD AND APPARATUS FOR MONITORING NETWORK TRAFFIC

GOVERNMENT LICENSE RIGHTS

This invention was made with government support under W911QX-07-F-0023 and W911 QX-12-F-0052 awarded by the U.S. Army Research Laboratory. The government has certain rights in the invention.

BACKGROUND

1. Field

Embodiments of the invention relate to monitoring of network traffic, such as, but not limited to, methods of training a neural network to monitor network traffic and methods of monitoring network traffic using the trained neural network.

2. Description of Related Art

Network security systems rely on the ability to screen and monitor network traffic in order to identify unauthorized or malicious activity that may be considered harmful. In particular, network security systems seek to identify unwanted network usage while the usage is occurring or is about to occur so that appropriate action may be taken in response to the usage. In addition to identifying unwanted network usage, network security systems may record information about the unwanted network usage, attempt to prevent/stop the unwanted network usage, and/or report the unwanted network usage to appropriate personnel.

SUMMARY

One embodiment is a system that collects data from monitored network traffic. The system inputs, in parallel, the data through inputs of a neural network. The system compares an output of the neural network, generated in response to the inputted data, to at least one predetermined output. If the output of the neural network corresponds to the at least one predetermined output, the system provides a notification relating to the data.

DETAILED DESCRIPTION

One embodiment of the present invention monitors, in real-time or near real-time, network traffic information by utilizing the learning abilities and parallel-analysis abilities of neural networks. Specifically, certain embodiments use neural networks to learn patterns and to respond, in parallel, to a multitude of input patterns. The responses provided by the neural networks may be determined or learned. The process by which a neural network learns and responds to different inputs may be generally referred to as a "training" process.

Certain embodiments provide methods by which a neural network can be trained to identify elements (e.g., specific keywords) transmitted within network traffic information (e.g., via transmitted network packets). Certain embodiments may generate a report regarding the identifying of elements and submit the report to a network security analyst for further investigation. As such, certain embodiments provide real-time or near real-time network traffic monitoring and detection of unwanted activity.

Instances of unwanted activity/network usage may be identified in advance by determining whether a known malicious user is connecting to a secured network from a known address (e.g., internet address or MAC system address). A known malicious user may follow a known set of process steps to bypass a network's security system to gain access to restricted information.

Network security systems that seek to identify unwanted network usage may be generally known as intrusion detection systems (IDS) or intrusion prevention systems (IPS). One challenge in monitoring network traffic is that it may be difficult to monitor network traffic in real-time or in near real-time. This can be because the throughput of the network traffic may overwhelm the computing abilities of a sensor performing the monitoring on the passing network-traffic patterns.

In previous methods for performing network monitoring, some portions of network traffic information (e.g., transmitted packets) are not able to be inspected in real-time, nor in near real-time, and some packets are ultimately dropped from inspection altogether. With the previous methods, performing analysis on the incoming packets may be delayed.

The shortcomings of the previous methods may result from the manner in which the previous methods process network traffic information. The previous methods follow a conventional serial batch-and-queue model of operation to process network traffic information. By processing the network traffic information serially, substantial delays in processing may occur.

Certain embodiments of the present invention overcome the shortcomings of the previous methods by using a parallel-computing architecture instead of an architecture that analyzes network information serially. Certain embodiments teach/encode multiple rules for monitoring network traffic within a neural network so that the neural network may monitor network traffic in accordance with the multiple rules. For example, the neural network may monitor the network traffic for keywords that correspond to email addresses, internet addresses, internet protocol addresses, executable requests, etc., as determined by the rules. These keywords may be associated with unwanted network usage. Certain embodiments may have hundreds or thousands of rules that define keywords to be monitored. Such monitoring may be performed in parallel within a single step by the neural network.

After the neural network has learned the rules, the neural network may monitor network traffic and, when a particular keyword associated with malicious network usage is detected, the neural network may then provide an output that corresponds to the keyword. This output may then be presented to a user who could then take action to protect the network from a malicious user.

In one embodiment, by using a physically instantiated neural network (e.g., hardware-implemented neural network), an apparatus may perform high-performance network monitoring while also being energy-efficient. Such an apparatus may be a part of an embedded system. In one embodiment, the apparatus may include a complementary metal-oxide-semiconductor (CMOS) based distributed neural-network-computing architecture. These embodiments may provide a network-monitoring and intrusion-detection system that is of small size, that is of small weight, and that uses low power. Such embodiments may perform network monitoring in real-time while being embedded within other systems. Certain embodiments may be implemented within mobile devices to protect mobile devices from intrusions or hacking.

By using processors that are dedicated to providing hardware-implemented neural networks, the processing speeds may be improved by orders of magnitude in comparison to software-implemented neural networks.

Specifically, certain embodiments may analyze all rules (i.e., parameters for network monitoring) in parallel. These embodiments may achieve such functionality by being trained and tested using raw/live network traffic information.

Figure 1:
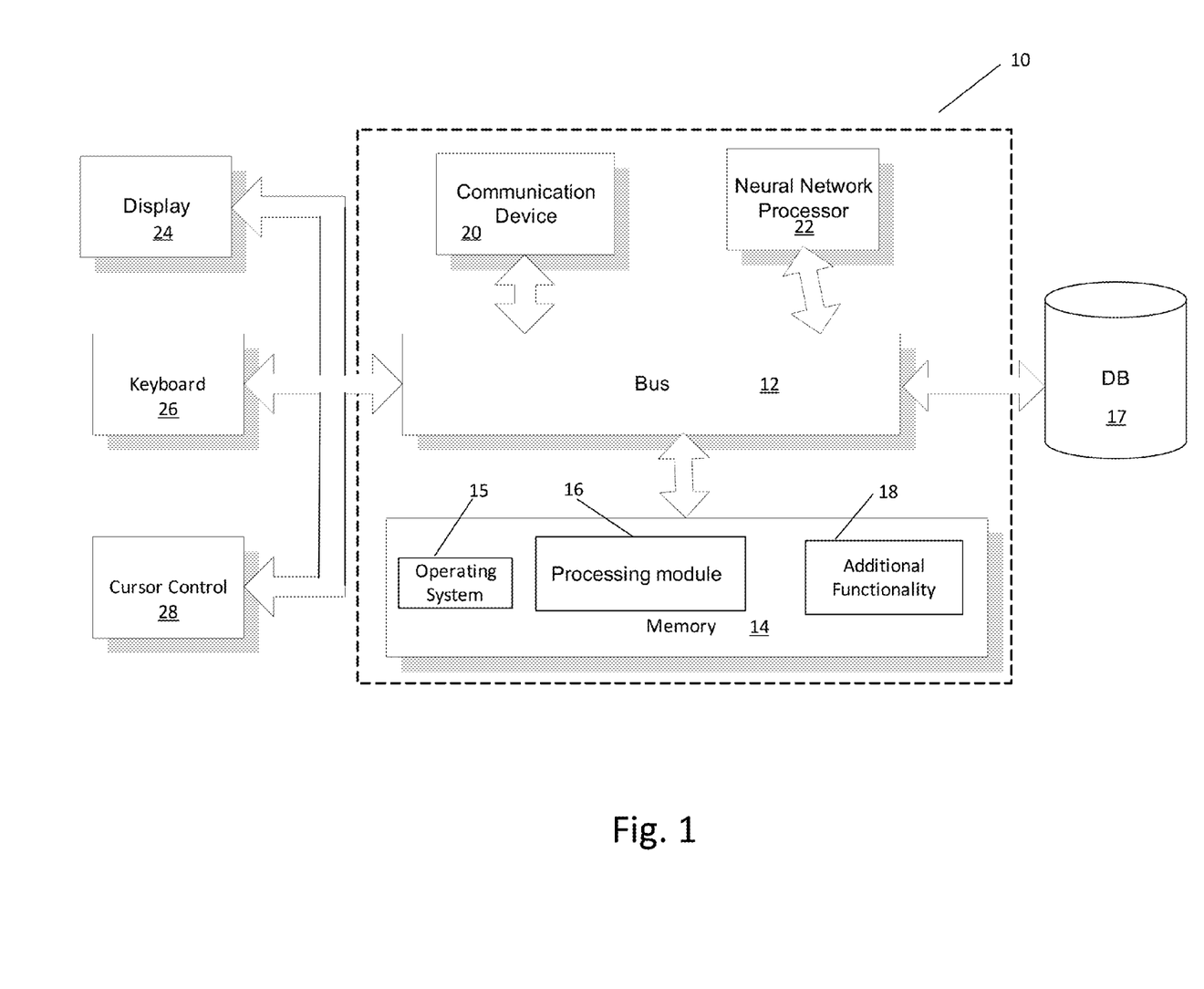
FIG. 1 is an overview block diagram of a computer system for monitoring network traffic in accordance with one embodiment.

FIG. 1 is an overview block diagram of a computer system 10 for monitoring network traffic in accordance with one embodiment. Although shown as a single system, the functionality of system 10 can be implemented as a distributed system. System 10 includes a bus 12 or other communication mechanism for communicating information, and a neural network processor 22 coupled to bus 12 for processing information. Neural network processor 22 may be any type of general or specific purpose processor. As described above, neural network processor 22 may be a processor that has a neural network computing architecture. In one embodiment, neural network processor 22 may have a CMOS-based distributed neural network computing architecture. Neural network processor 22 may also include a processing system where a general and/or specific purpose processor operates in conjunction with a hardware-implemented neural network. System 10 further includes a memory 14 for storing information and instructions to be executed by processor 22. Memory 14 can include any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules may include an operating system 15 that provides operating system functionality for system 10. The modules may further include a processing module 16 that operates in conjunction with processor 22 to enable monitoring of network traffic, as disclosed in more detail below. System 10 can be part of a larger system. Therefore, system 10 will typically include one or more additional functional modules 18 to include the additional functionality, such as data processing functionality for receiving and processing rules to be learned by processor 22. In certain embodiments, a neural network architecture may be implemented by processing module 16 instead of processor 22. In other embodiments, a neural network architecture may be implemented by, at least, both processing module 16 and processor 22. A database 17 is coupled to bus 12 to store data used with modules 16 and 18. Specifically, database 17 may store data that is used for training processing module 16 and/or processor 22.

Figure 2:
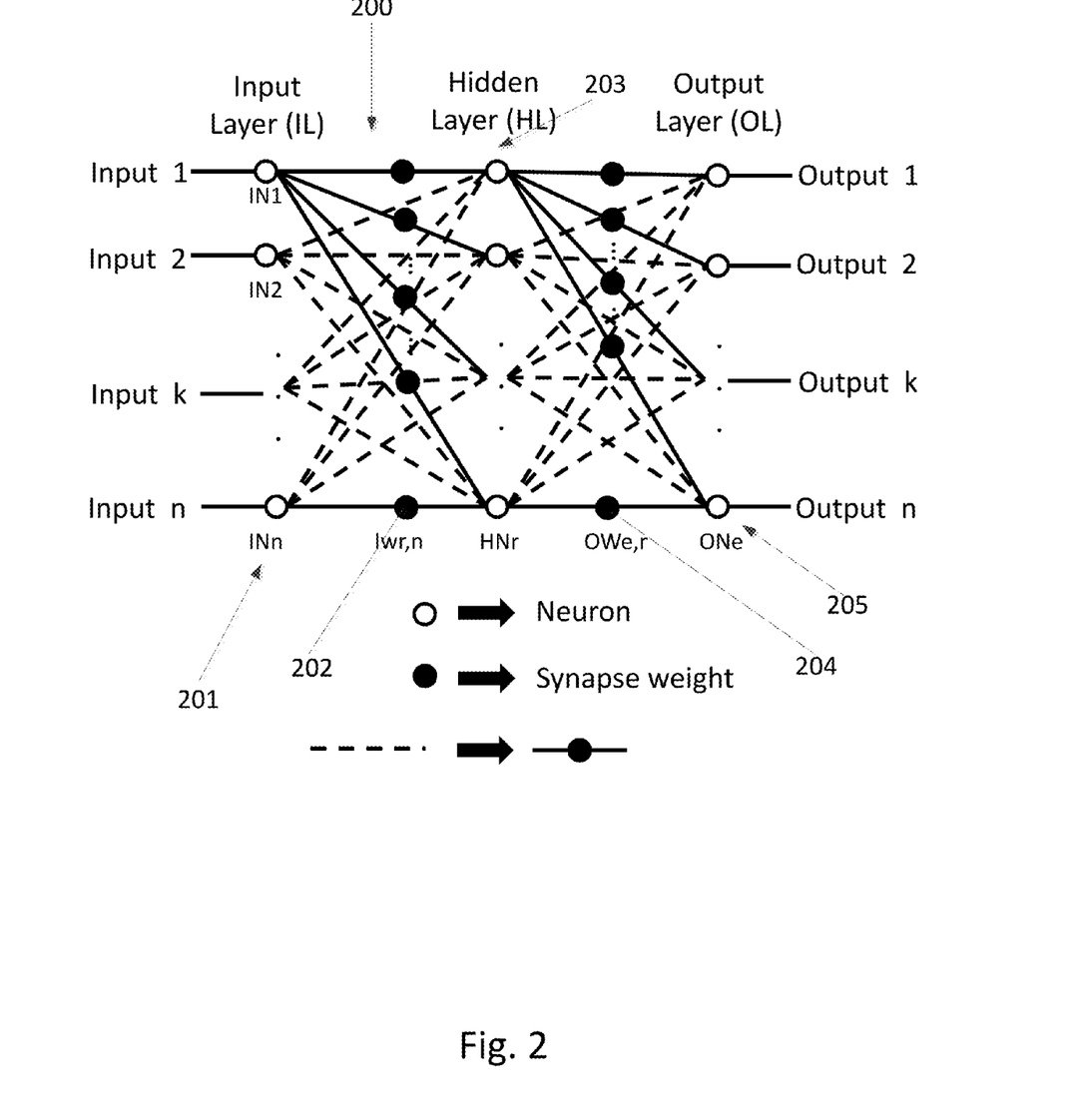
FIG. 2 illustrates a neural network in accordance with one embodiment.

FIG. 2 illustrates a neural network 200 in accordance with one embodiment. As described above, the neural network 200 may be implemented utilizing processor 22 and/or processing module 16 of FIG. 1. Neural network 200 may include a plurality of artificial neurons that are logically arranged in different layers (e.g., input layer 201, hidden layer 203, and output layer 205). A neuron may be generally understood as a computing unit within a neural network that receives at least one input via the neural network and, in response to the input, produces at least one output. Certain embodiments may use a feed forward topography and architecture that is fully inter-layer connected. A fully inter-layer connected neural network may mean that each neuron in a particular layer of the network 200 is connected to every neuron in the following neuron layer. FIG. 2 shows the topography of a neural network 200 in which each neuron (i.e., IN1 to INn) in the input layer 201 (IL) is connected to every neuron in the hidden layer 203 (HL). Similarly, every neuron in the HL 203 is connected to every neuron in the output layer 205 (OL). A connection between two neurons may be modulated by a synaptic weight element (e.g., 202 and 204). In certain embodiments, neurons within the same layer are not connected to each other. For example, a neuron within the input layer may not be connected to any other neuron within the same input layer. Similarly, a neuron within HL layer 203 may not be connected to any other neuron within HL layer 203. Similarly, a neuron within OL layer 205 may not be connected to any other neuron within OL layer 205.

In certain embodiments, input layer 201 may include a plurality of neurons (i.e., IN1 to INn), indicating a "first" neuron to an "nth" neuron in the input layer 201. The above-described naming convention may be used for neurons in the hidden and output layers, respectively. The naming convention for all synaptic weight elements may also be similar. For example, a first synaptic weight may be named IW1,1 (i.e., an Input Weight connecting neuron IN1 and neuron HN1). The last synaptic weight may be named IWr,n (Input Weight connecting INn and HNr). Because network 200 shown in FIG. 2 is fully connected, the number of hidden layer weight elements equals the number of input neurons, n, multiplied by the number of hidden layer neurons, r, as shown by Equation (1) below.

Similarly, in a fully-connected network, the number or output layer weight elements equals the number of hidden layer neurons, r, multiplied by the number of output layer neurons, e, as shown by Equation (2) below. Thus, in certain embodiments, although hidden and output layer neurons receive inputs from multiple neurons from the preceding layer, a single synaptic weight element connects any two individual neurons from each layer.

$$\text{Number } IW = n \times r \quad (1)$$

$$\text{Number } OW = r \times e \quad (2)$$

In certain embodiments, each neuron in HL 203 may perform the mathematical operation as shown in Equation (3). For example, certain embodiments calculate the output of HN1 (where r=1) which equals the summation of n multiplications in which the value from each input neuron, INi, is multiplied by the value of the connecting weight element IW1,i, for each neuron in the IL 201 from i=1 to n, with n being the total number of neurons in IL 201. Similarly, the output for the OL 205 neurons, ONe, is calculated using Equation (4) as shown below.

$$HNr = \sum_{i=1}^{n} INi \times IWr, i \quad (3)$$

$$ONe = \sum_{i=1}^{r} HNi \times OWe, i \quad (4)$$

During the training and operating steps of the neural network 200, each output of the neural network 200 will include a binary value. For example, if an output as calculated according to equations (3) or (4) is greater than or equal to a defined threshold value, Vt, the output of the neuron will be equal to one, and if the output is less than Vt, the output of neuron will be zero. Therefore, the output of any neuron includes a binary value of one or zero. Therefore, the neuron output equations are determined in accordance with Equations (5) and (6) as shown below:

$$HNr = \begin{cases} 1 & \text{if } Vt \leq \sum_{i=1}^{n} INi \times IWr, i \\ 0 & \text{if } Vt > \sum_{i=1}^{n} INi \times IWr, i \end{cases} \quad (5)$$

$$ONe = \begin{cases} 1 & \text{if } Vt \leq \sum_{i=1}^{r} HNi \times OWe, i \\ 0 & \text{if } Vt > \sum_{i=1}^{r} HNi \times OWe, i \end{cases} \quad (6)$$

Figure 3:
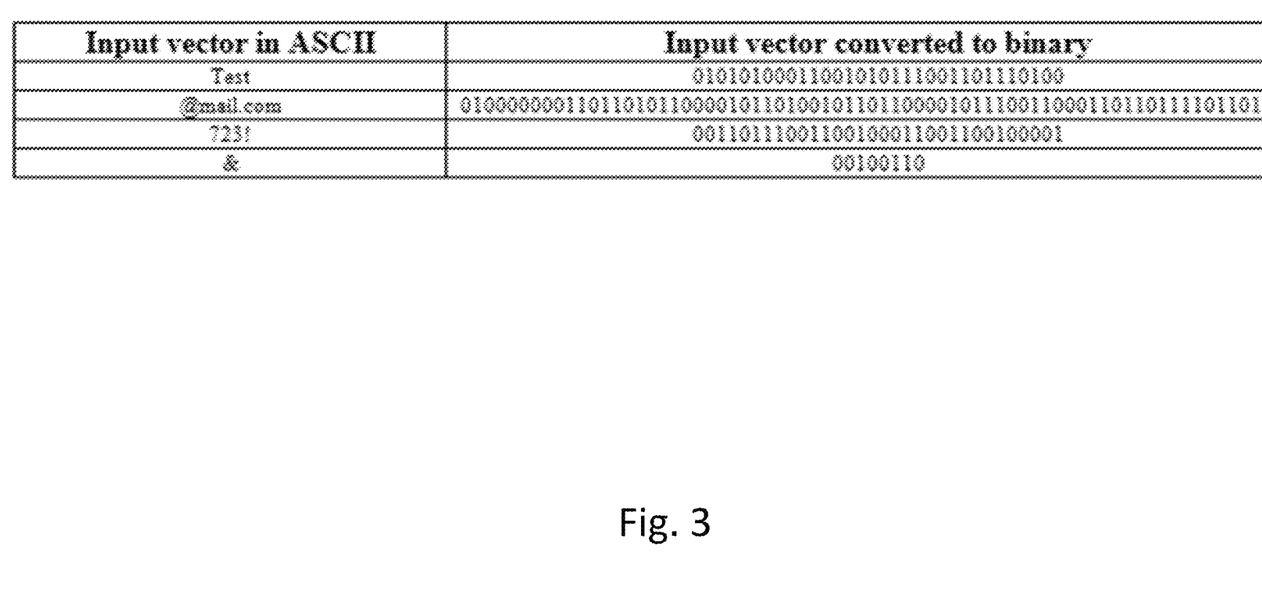
FIG. 3 illustrates ASCII and binary representations of different input vectors in accordance with one embodiment.

FIG. 3 illustrates ASCII and binary representations of different input vectors in accordance with one embodiment. These input vectors may be inputted into input layer 201 of FIG. 2. In certain embodiments, the input into the neural network 200 may be a vector comprising a binary representation of ones and zeros. For example, referring to FIG. 3, different ASCII characters may be represented in binary. Each single ASCII character may be converted into an 8-bit binary representation.

Figure 4:
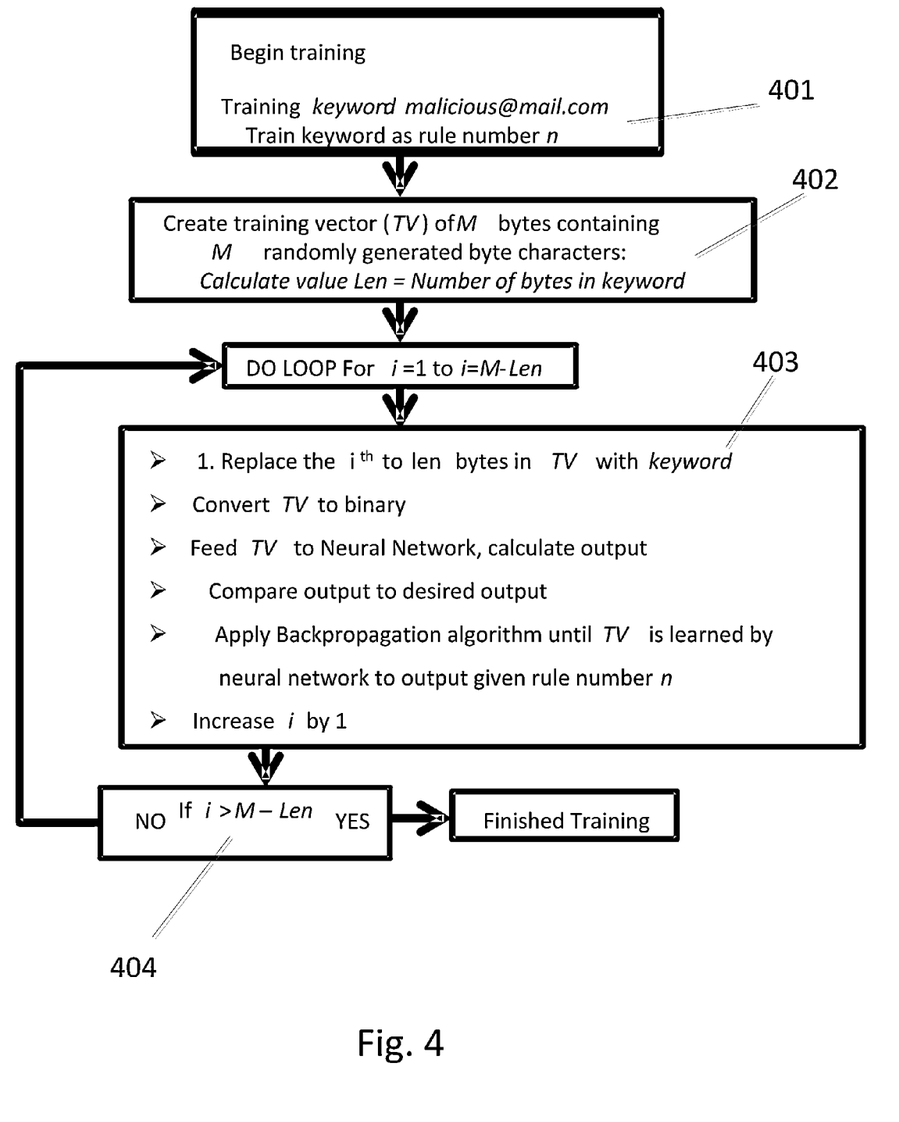
FIG. 4 is a flow diagram of a process for training a neural network to monitor network traffic in accordance with one embodiment.

FIG. 4 is a flow diagram of a process for training neural network 200 to monitor network traffic in accordance with one embodiment. In one embodiment, the functionality of the flow diagram of FIG. 4 is implemented by software stored in memory or other tangible computer readable medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In certain embodiments, information may be encoded or taught to the neural network 200 using an algorithm. In one embodiment, an algorithm such as the Backpropagation algorithm may be used to train neural network 200. While training the neural network, the training algorithm may be employed to determine appropriate values for the synaptic weight elements and to update the synaptic weight elements of the network in order to produce a given deterministic input/output response. For example, if the designated output of the neural network is to be "1010101" in instances when the training input to the neural network is "@mail.com," the training algorithm would find the appropriate values for all synaptic weight elements that would enable the neural network to output the pre-selected output (i.e., "1010101") in response to the specific trained input value (i.e., "@mail.com"). In the particular example of using an input vector corresponding to "@mail.com," the number or input neurons may be the number of bits in the input vector (i.e., 72 bits/neurons corresponding to 8-bits for each of the nine ASCII characters of "@mail.com").

The training process (e.g., presenting training information to the neural network) is a process that may ensure robust operation under a variety of input conditions. For the training and operation of the neural network, certain embodiments use a methodology that allows for the neural network to pick or to be sensitive to specific keywords, combinations of words, and phrases for which the neural network should generate/provide a specific output value.

For example, at 401, the training of a neural network may begin. For example, the network may be trained in accordance with a specific rule (e.g., "rule number n"). The rule may indicate that the neural network should detect a specific input (e.g., a keyword such as "malicious@mail.com").

At 402, a training vector (TV) may be created to train the neural network. Training vector (TV) may include a specific number of bytes (i.e., "M" bytes) of randomly generated byte characters. A value (e.g., value "Len") may also be calculated based upon how many bytes are in the specific input keyword. In the example of a keyword such as "malicious@mail.com," the value Len may be "18," corresponding to the 18 characters of the keyword. As described above, each character within a keyword may be represented by one byte (i.e., eight bits of binary information).

At 403, a portion of the training vector (TV) is replaced with at least a portion of the specific input keyword. The portion of training vector (TV) to be replaced may be determined by how many loop iterations have been performed.

For example, on a first loop iteration (i.e., "i"=1), at 403, the first byte to the eighteenth byte (i.e., corresponding to the value of "Len") of the training vector (TV) would be replaced by portions of the keyword.

Upon completing subsequent loop iterations, for example, on the tenth iteration (i.e., "i"=10), at 403, the tenth byte to the eighteenth byte of the training vector (TB) would be replaced by portions of the keyword.

After each replacement of the portion of the training vector (TV) with the portion of the keyword, the training vector (TV) may be converted into a binary representation. The training vector (TV) may then be fed into the neural network for which training is to be performed. After the training vector (TV) has been fed into the neural network, the output is then calculated. The calculated output is then compared to a desired/pre-selected output. After the comparison between the calculated output and the desired/pre-selected output, an algorithm (such as the Backpropagation algorithm) may be applied until the neural network has learned to output the desired/pre-selected output when encountering the specific keyword. The value of "i" may then be increased by "1" to reflect the completed iteration.

At 404, the above-described process associated with 403 may be looped through (i.e., repeated) until the value of "i" is greater than the difference between "M" and "Len."

Figure 5:
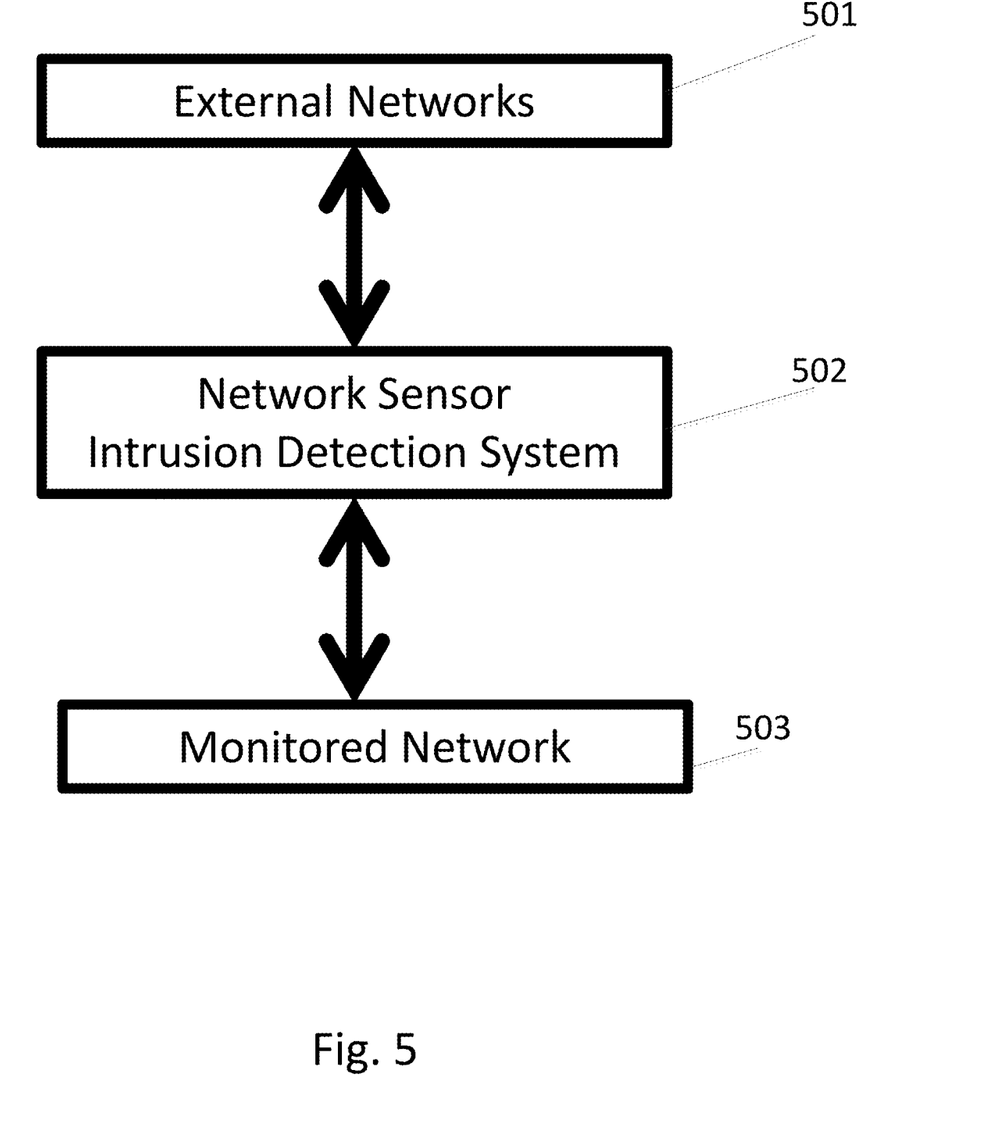
FIG. 5 is an overview block diagram of a system for monitoring network traffic in accordance with one embodiment.

FIG. 5 is an overview block diagram of a system for monitoring network traffic in accordance with one embodiment. As shown in FIG. 5, a data input (e.g., a network packet) is captured by a network sensor/intrusion detection system 502 that monitors a port (e.g., an Ethernet port). Computer system 10 of FIG. 1 may be integrated with and/or operate in conjunction with network sensor/intrusion detection system 502. The Ethernet port may be configured to collect network traffic in a "promiscuous mode" from any external network connections 501 to the network 503 that are to be monitored for unwanted intrusion, usage, or anomalous activity. "Promiscuous mode" may be considered to be a process that allows a Wired Network Interface Controller (NIC) or Wireless Network Interface Controller (WNIC) controllers to pass all received traffic to a Central Processing Unit (CPU) or neural network in the sensor. The Ethernet port, in promiscuous mode, may also perform "packet sniffing," which allows for the capture of all packets traveling past the local sensor in the network.

Certain embodiments perform packet capturing using the method provided by pcap, which is a capturing method used in TcpDump/WinDump, Wireshark™, TShark™, SNORT™, and many other networking tools. A data packet on an Ethernet link may be referred to as an Ethernet frame. An Ethernet frame may begin with a preamble and a start frame delimiter. Next, each Ethernet frame may continue with an Ethernet header featuring destination and source MAC addresses. The middle section of the Ethernet frame may be the payload data, including any headers for other protocols (e.g., Internet Protocol) carried in the frame. The Ethernet standard may limit the size of an Ethernet packet/frame to a maximum of 1,514 bytes (corresponding to 14 bytes of Ethernet header with 1,500 bytes of data). The smallest packet size may be 64 bytes (corresponding to 14 bytes of MAC Header with 46 bytes of data and 4 bytes of CRC). Any and all portions of a given Ethernet frame may be fed into a trained neural network, as described in more detail below.

Figure 6:
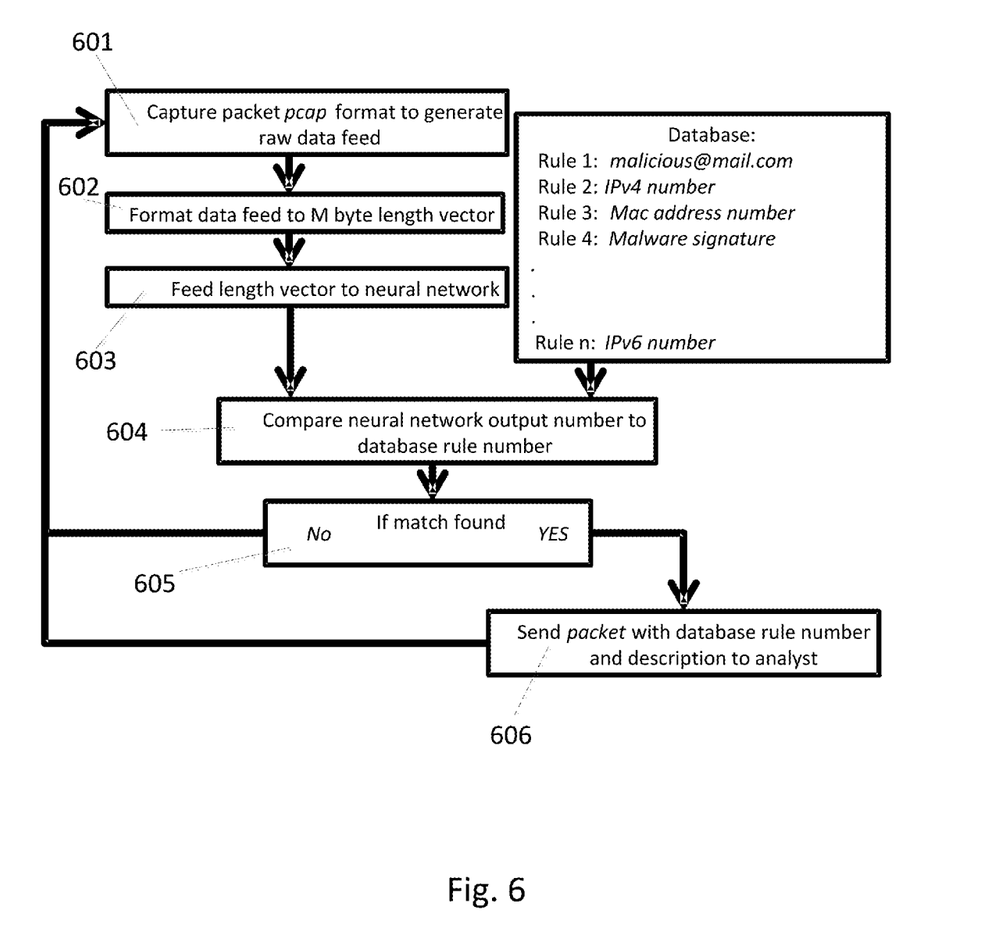
FIG. 6 is a flow diagram of a process for monitoring network traffic using a trained neural network in accordance with one embodiment.

FIG. 6 is a flow diagram of a process for monitoring network traffic using a trained neural network in accordance with one embodiment. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 601, the system may capture network traffic information (e.g., capture packets using a network sensor NIC Ethernet port). As described above, the information may be captured using pcap methods. Each network packet size may range from 64 bytes to 1514 bytes. Thus, a number of (binary) inputs to the neural network may be equal to 1,514 bytes multiplied by 8 bits per byte (i.e., 12,112 input neurons). At 602, certain embodiments may format the captured packets into vectors with lengths of M bytes. Certain embodiments may convert each input packet into a binary input vector, as illustrated in FIG. 3. At 603, the system may feed input vectors to the neural network and check the corresponding output to determine if any input packets match packets described within the trained detection rules. As described above, the system may feed/input the input vectors in parallel. At 604, the system compares the output of the neural network against a rule database of known rules. By using the parallel-analysis abilities of the neural network, the input packets may be compared against all detection rules simultaneously and in parallel. If a match is found at 605, then, at 606, the system may send information to an analyst. The sent information may include a packet number from pcap data, an identified rule from the database, and/or a current network packet. The system may then return to 601 if the neural network does not provide any packet that matches packets described within any rule in the database.

Figure 7:
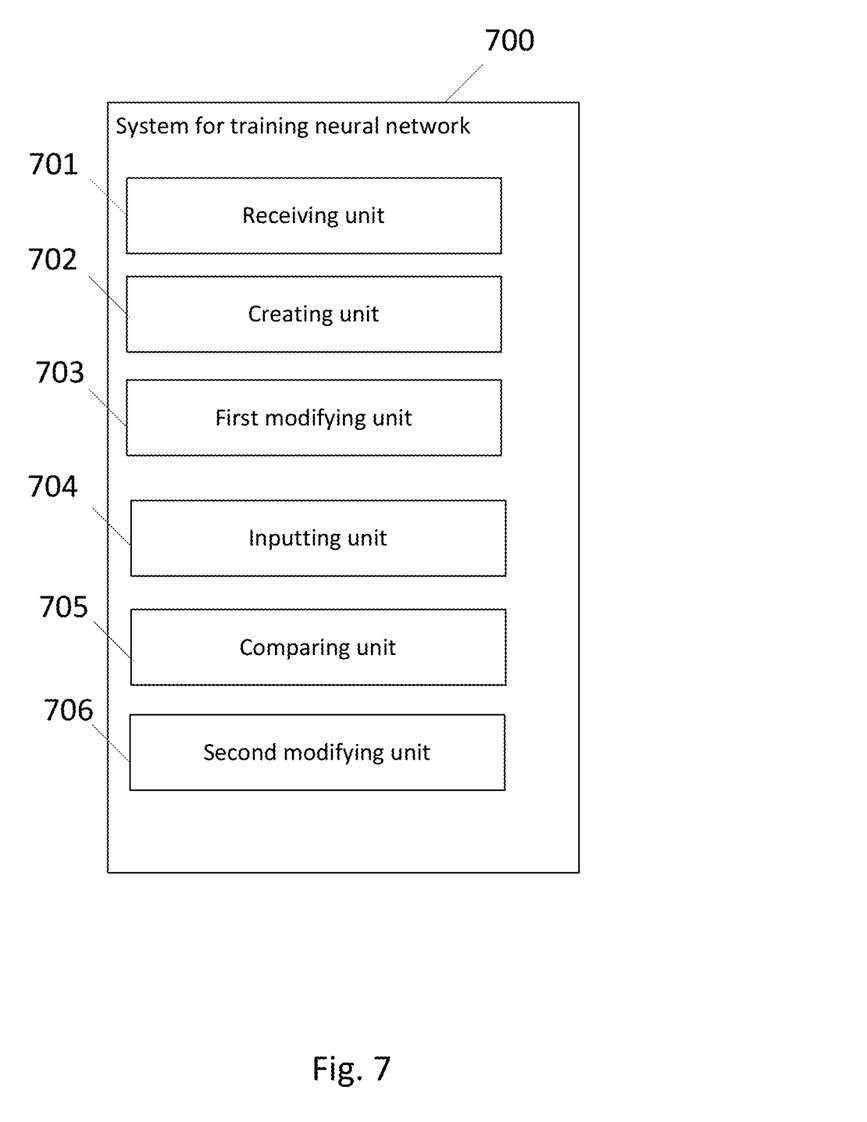
FIG. 7 illustrates an apparatus according to another embodiment.

FIG. 7 illustrates an apparatus 700 according to another embodiment. In an embodiment, apparatus 700 may be a system for training a neural network. Apparatus 700 may include a receiving unit 701 configured to receive a keyword that is to be detected by a neural network. Apparatus 700 may also include a creating unit 702 configured to create a training vector. Apparatus 700 may also include a first modifying unit 703 configured to modify the training vector by replacing a portion of the training vector with a portion of the keyword. Apparatus 700 may also include an inputting unit 704 configured to input, in parallel, the modified training vector into the neural network. Apparatus 700 may also include a comparing unit 705 configured to compare an output of the neural network, generated in response to inputting the modified training vector, with a desired output. Apparatus 700 may also include a second modifying unit 706 configured to modify the neural network so that the output of the neural network corresponds to the desired output.

Figure 8:
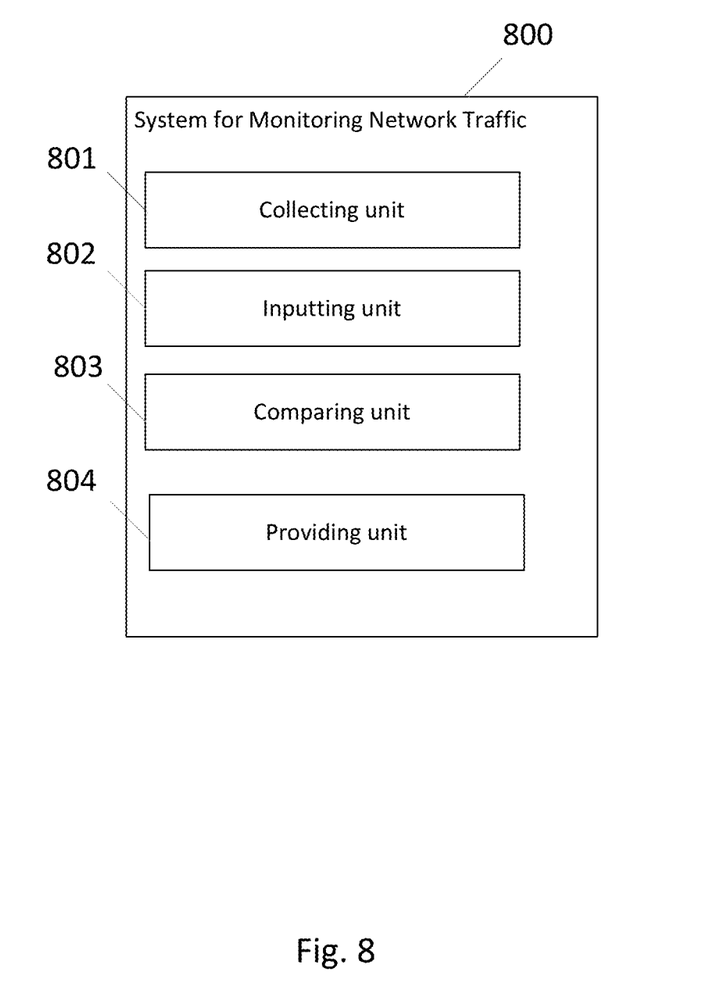
FIG. 8 illustrates an apparatus according to another embodiment.

FIG. 8 illustrates an apparatus 800 according to another embodiment. In an embodiment, apparatus 800 may be a system for monitoring network traffic. Apparatus 800 may include a collecting unit 801 configured to collect data from monitored network traffic. Apparatus 800 may also include an inputting unit 802 configured to input, in parallel, the data through inputs of a neural network. Apparatus 800 may also include a comparing unit 803 configured to compare an output of the neural network, generated in response to the inputted data, to at least one predetermined output. Apparatus 800 may also include a providing unit 804 configured to, if the output of the neural network corresponds to the at least one predetermined output, provide a notification relating to the data.

Figure 9:
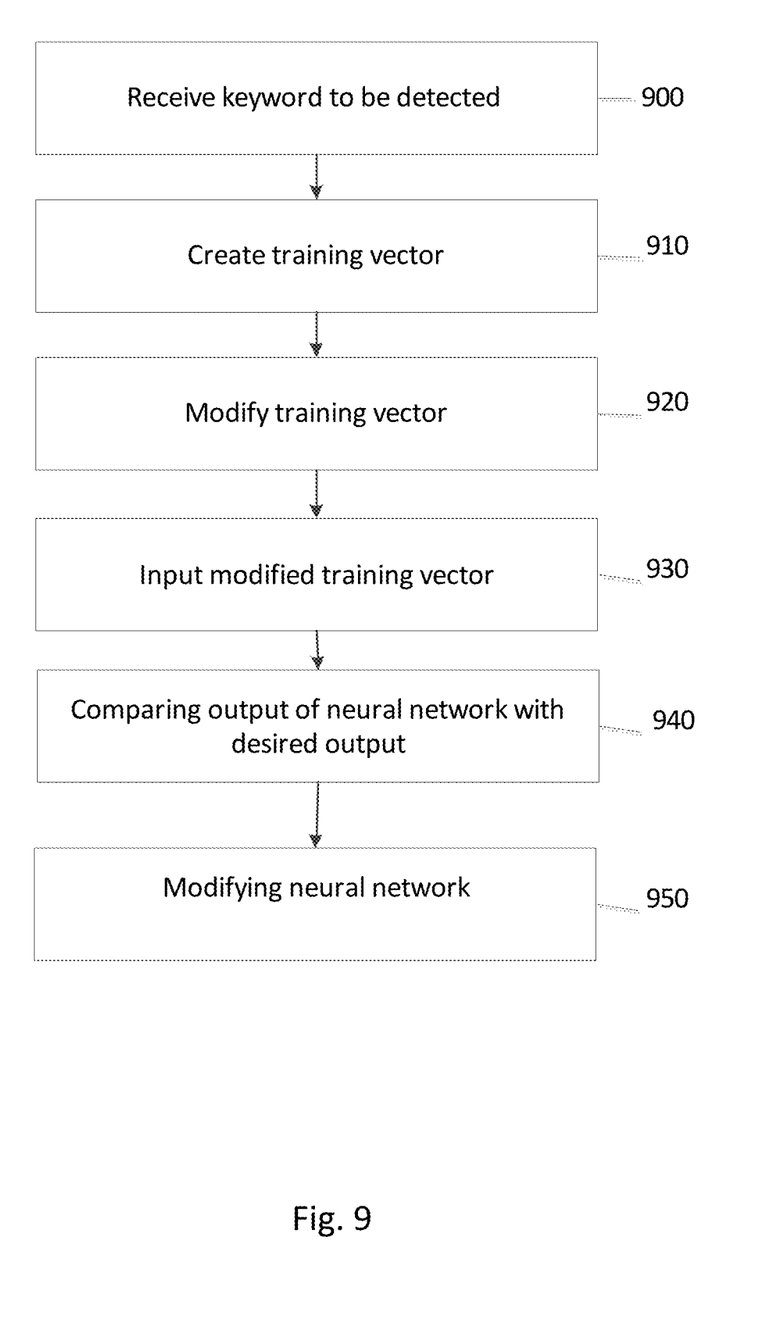
FIG. 9 illustrates a logic flow diagram of a method according to one embodiment.

FIG. 9 illustrates a logic flow diagram of a method according to one embodiment. In an embodiment, the method illustrated in FIG. 9 includes, at 900, receiving a keyword that is to be detected by a neural network. At 910, a training vector may be created. At 920, the training vector may be modified by replacing a portion of the training vector with a portion of the keyword. At 930, the modified training vector may be inputted, in parallel, into the neural network. At 940, an output of the neural network, generated in response to inputting the modified training vector, may be compared with a desired output. At 950, the neural network may be modified so that the output of the neural network corresponds to the desired output.

Figure 10:
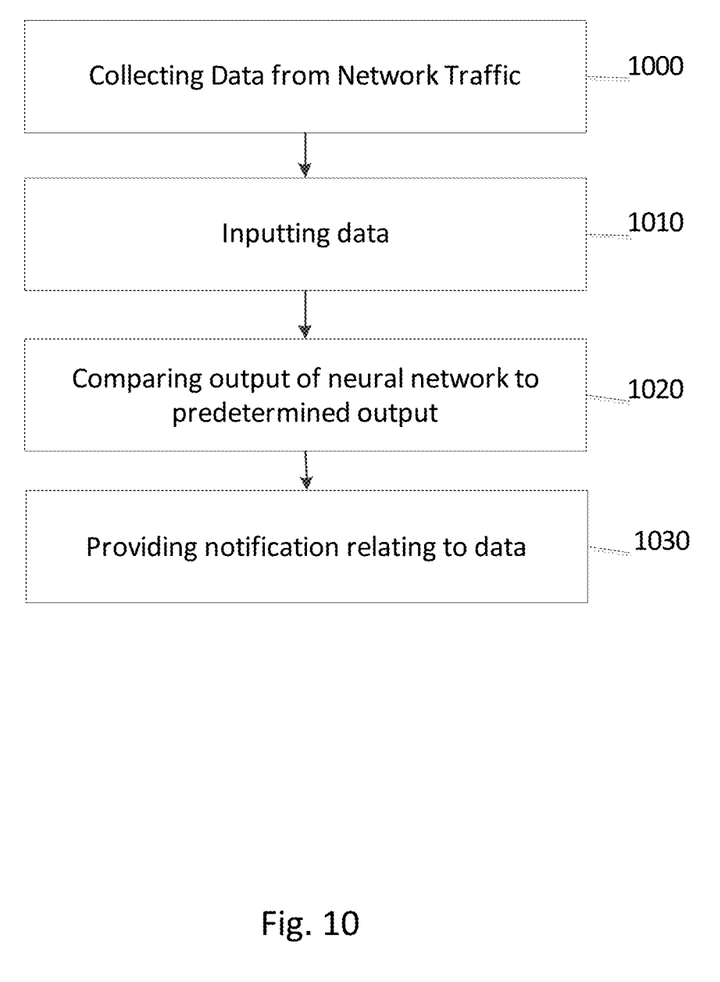
FIG. 10 illustrates a logic flow diagram of a method according to another embodiment.

FIG. 10 illustrates a logic flow diagram of a method according to another embodiment. In an embodiment, the method illustrated in FIG. 10 includes, at 1000, collecting data from monitored network traffic. At 1010, the data may be inputted, in parallel, through inputs of a neural network. At 1020, an output of the neural network, generated in response to the inputted data, may be compared to at least one predetermined output. At 1030, if the output of the neural network corresponds to the at least one predetermined output, a notification relating to the data may be provided.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer program embodied on a non-transitory computer readable medium, said computer readable medium having instructions stored thereon that, when executed by a computer, causes the computer to perform:
   receiving a keyword that is to be detected by a neural network;
   creating a training vector;
   replacing a portion of the training vector with a portion of the keyword;
   inputting, in parallel, the training vector into the neural network;
   comparing an output of the neural network, generated in response to inputting the training vector, with a desired output; and
   modifying the neural network so that the output of the neural network corresponds to the desired output, wherein the replacing the portion of the training vector, the inputting, the comparing, and the modifying the neural network are performed a plurality of iterations, and each successive iteration changes the portion of the keyword that replaces the portion of the training vector.

2. The computer program of claim 1, wherein modifying the neural network comprises configuring synaptic weight elements of the neural network.

3. The computer program of claim 1, wherein the number of iterations of the plurality of iterations is based upon the length of the training vector and the length of the keyword.

4. A method comprising:
   receiving a keyword that is to be detected by a neural network;
   creating a training vector;
   replacing a portion of the training vector with a portion of the keyword;
   inputting, in parallel, the training vector into the neural network;
   comparing an output of the neural network, generated in response to inputting the training vector, with a desired output; and
   modifying the neural network so that the output of the neural network corresponds to the desired output, wherein the replacing the portion of the training vector, the inputting, the comparing, and the modifying the neural network are performed a plurality of iterations, and each successive iteration changes the portion of the keyword that replaces the portion of the training vector.

5. The method of claim 4, wherein modifying the neural network comprises configuring synaptic weight elements of the neural network.

6. The method of claim 4, wherein the number of iterations of the plurality of iterations is based upon the length of the training vector and the length of the keyword.

7. A system comprising:
   a receiving unit configured to receive a keyword that is to be detected by a neural network;
   a creating unit configured to create a training vector;
   a replacing unit configured to replace a portion of the training vector with a portion of the keyword;
   an inputting unit configured to input, in parallel, the training vector into the neural network;
   a comparing unit configured to compare an output of the neural network, generated in response to inputting the training vector, with a desired output; and
   a modifying unit configured to modify the neural network so that the output of the neural network corresponds to the desired output, wherein the replacing the portion of the training vector, the inputting, the comparing, and the modifying the neural network are performed a plurality of iterations, and each successive iteration changes the portion of the keyword that replaces the portion of the training vector.

8. The system of claim 7, wherein modifying the neural network comprises configuring synaptic weight elements of the neural network.

9. The system of claim 7, wherein the number of iterations of the plurality of iterations is based upon the length of the training vector and the length of the keyword.

10. A computer program embodied on a non-transitory computer readable medium, said computer readable medium having instructions stored thereon that, when executed by a computer, causes the computer to perform:
    collecting data from monitored network traffic;
    inputting, in parallel, the data through inputs of a neural network;
    comparing an output of the neural network, generated in response to the inputted data, to at least one predetermined output, wherein a training vector comprises a portion of a keyword to be detected, the neural network has been trained by inputting the training vector into the neural network, and the training comprises inputting the training vector a plurality of iterations, and each successive iteration changes the portion of the keyword comprised by the training vector; and
    if the output of the neural network corresponds to the at least one predetermined output, providing a notification relating to the data.

11. The computer program of claim 10, wherein comparing the output of the neural network comprises comparing the output of the neural network to at least one predetermined output associated with unwanted network usage.

12. The computer program of claim 10, wherein comparing the output of the neural network comprises comparing, in parallel, the output of the neural network to a plurality of predetermined outputs associated with unwanted network usage.

13. A method comprising:
    collecting data from monitored network traffic;
    inputting, in parallel, the data through inputs of a neural network;
    comparing an output of the neural network, generated in response to the inputted data, to at least one predetermined output, wherein a training vector comprises a portion of a keyword to be detected, the neural network has been trained by inputting the training vector into the neural network, and the training comprises inputting the training vector a plurality of iterations, and each successive iteration changes the portion of the keyword comprised by the training vector; and
    if the output of the neural network corresponds to the at least one predetermined output, providing a notification relating to the data.

14. The method of claim 13, wherein comparing the output of the neural network comprises comparing the output of the neural network to at least one predetermined output associated with unwanted network usage.

15. The method of claim 13, wherein comparing the output of the neural network comprises comparing, in parallel, the output of the neural network to a plurality of predetermined outputs associated with unwanted network usage.

16. A system comprising:
- a collecting unit configured to collect data from monitored network traffic;
- an inputting unit configured to input, in parallel, the data through inputs of a neural network;
- a comparing unit configured to compare an output of the neural network, generated in response to the inputted data, to at least one predetermined output, wherein a training vector comprises a portion of a keyword to be detected, the neural network has been trained by inputting the training vector into the neural network, the training comprises inputting the training vector a plurality of iterations, and each successive iteration changes the portion of the keyword comprised by the training vector; and
- a providing unit configured to, if the output of the neural network corresponds to the at least one predetermined output, provide a notification relating to the data.

17. The system of claim 16, wherein comparing the output of the neural network comprises comparing the output of the neural network to at least one predetermined output associated with unwanted network usage.

18. The system of claim 16, wherein comparing the output of the neural network comprises comparing, in parallel, the output of the neural network to a plurality of predetermined outputs associated with unwanted network usage.

* * * * *